W. H. JONES.
BRAKE APPARATUS.
APPLICATION FILED JUNE 12, 1911.
1,072,123.
Patented Sept. 2, 1913.
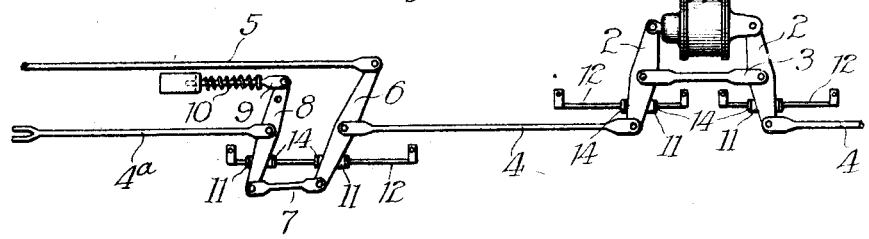
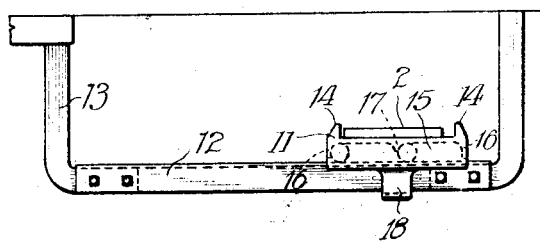
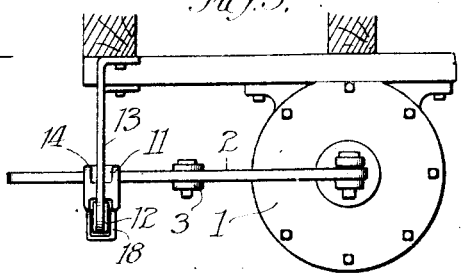
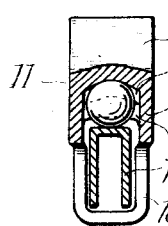
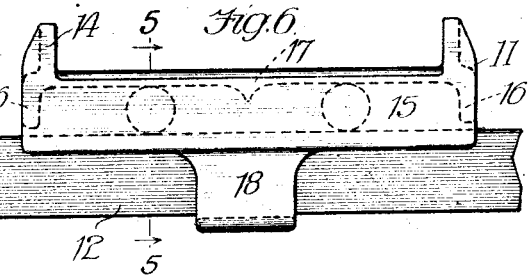
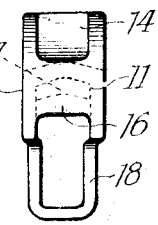

UNITED STATES PATENT OFFICE.

WILLIAM H. JONES, OF CHICAGO, ILLINOIS.

BRAKE APPARATUS.

1,072,123.   Specification of Letters Patent.   Patented Sept. 2, 1913.

Application filed June 12, 1911. Serial No. 632,624.

*To all whom it may concern:*

Be it known that I, WILLIAM H. JONES, a citizen of the United States, residing at Chicago, in the county of Cook and State of Illinois, have invented certain new and useful Improvements in Brake Apparatus, of which the following is a description, reference being had to the accompanying drawings, forming a part of this specification.

My invention relates to means for supporting the horizontally disposed levers which in the ordinary form of brake apparatus usually employed are supported simply on metal straps. By the provision of frictionless carriages and tracks for supporting these levers I have produced a brake apparatus which works much more smoothly than the usual form and thus insures a more ready and certain release of the brake shoes, and which is entirely free from the usual harsh and annoying rasping and grating noises incident to the usual form. Its novelty consists in the provision of a frictionless carriage in the combination and association of parts hereinafter described, and the construction and arrangement of such carriages; all as more fully pointed out in the appended claims.

Figure 1 of the drawings is a diagrammatic top plan view showing parts of a brake apparatus embodying my invention, parts connected to the right hand connecting rod 4 being omitted; Fig. 2 a side view of a track and carriage; Fig. 3 an end view of the same with the lever supported thereby and associated parts; and Figs. 4, 5, 6 and 7 details showing respectively a top view of the carriage, a cross-section of the carriage and track on the line 5—5 of Fig. 6, a side view of the carriage and an end view of the same.

Referring to Fig. 1, the pistons of the usual brake cylinder 1 are pivoted to the horizontal cylinder levers 2, which are pivotally connected to the equalizing cross bar or tie rod 3. The outer end of the levers 2 are pivotally connected to the inner ends of oppositely extending connecting rods 4 which, through intermediate connection, serve to operate the rods 4ᵃ and through them the brakes at the opposite ends of the car by means of usual and well-known connections, not illustrated. In order to enable the brakes to be set and released by hand, a connecting rod 5 which is operated by the ordinary hand brake (not shown) is pivotally connected at its inner end to a floating lever 6, pivoted intermediately to the rod 4 and at its other end to a link 7, which latter is pivoted to a fulcrum lever 8, intermediately connected to the rod 4ᵃ. Near its other end this lever 8 is pivotally attached to the framework of the car and a plunger rod 9 pivoted to the end of the lever and surrounded by a spring 10 tends to press the lever in a direction to release the brakes. It will readily be understood that with the arrangement and construction of parts thus far described, all of which are old and well-known, when the hand brake remains in unset position, the actuation of the pistons of the brake cylinder will cause a movement of the connecting rods 4, and through each rod of the lever 6 upon the pivotal connection of such lever with the rod 5 as a fulcrum; while if the air brake remains unoperated the movement by the hand brake of the rod 5 (toward the left, Fig. 1) will cause a movement of both rods 4 toward the left (same figure); the result in either case of the stress so applied to the described organization of links and levers being to draw the brakes inwardly or toward each other through the brake rod 4ᵃ of each brake, to cause the brakes to be applied to the car wheels.

Referring now particularly to the novel means I have devised for maintaining and supporting the levers and connected parts heretofore described in operative relation, the carriage 11 travels upon a track 12 supported at its ends by the framework of the car. Preferably, and as here illustrated, track 12 is bolted to end brackets 13, which are in turn bolted to cross beams at the bottom of the car, though such track and brackets may be integrally formed. The carriage 11 is provided on its upper side with upstanding end flanges 14, between which rests the particular lever for which the carriage is provided. The two balls upon which the carriage travels are retained in place by the depending side flanges 15 and depending end walls 16 connecting such side flanges, an intermediate cross-rib 17 serving to retain each ball in its own division of the ball chamber. The carriage is secured against displacement from the track by a strap 18 passing underneath the latter, and connecting the opposite edges of the flanges 15 of the carriage.

I claim:

1. In apparatus of the class described and in combination with a horizontal lever, a track suspended at its ends, a carriage adapted to travel thereon and carry said lever, said carriage having depending side flanges and end walls forming a ball chamber, balls in said chamber, and means for preventing lateral displacement of the lever with respect to the carriage.

2. In apparatus of the class described and in combination with a horizontal lever, a track suspended at its ends, a carriage arranged to travel thereon and having a ball chamber divided transversely into two compartments, and a ball in each compartment, said carriage being arranged to carry said lever.

3. In apparatus of the class described and in combination with a horizontal lever, a track suspended at its ends, a carriage thereon, said carriage being equipped with upstanding end flanges and with depending side flanges and end walls forming a ball chamber, and balls in said chamber.

4. In apparatus of the class described and in combination with a horizontal lever, a track suspended at its ends, a carriage thereon, said carriage being equipped with upstanding end flanges and with depending side flanges and end walls forming a ball chamber and also with a depending strap, and balls in said ball chamber.

WILLIAM H. JONES.

Witnesses:
Louis B. Erwin,
Robert Dobberman.

---

Copies of this patent may be obtained for five cents each, by addressing the "Commissioner of Patents, Washington, D. C."